(12) United States Patent
Agarwal et al.

(10) Patent No.: US 9,361,323 B2
(45) Date of Patent: Jun. 7, 2016

(54) DECLARATIVE SPECIFICATION OF DATA INTEGRATION WORKFLOWS FOR EXECUTION ON PARALLEL PROCESSING PLATFORMS

(75) Inventors: Manoj K. Agarwal, Noida (IN); Himanshu Gupta, New Delhi (IN); Rajeev Gupta, Noida (IN); Sanjeev K. Gupta, Los Altos, CA (US); Mukesh K. Mohania, Agra (IN); Sriram K. Padmanabhan, San Jose, CA (US); Prasan Roy, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 13/252,465

(22) Filed: Oct. 4, 2011

(65) Prior Publication Data

US 2013/0086116 A1    Apr. 4, 2013

(51) Int. Cl.
| | | |
|---|---|---|
| G06F 7/00 | (2006.01) | |
| G06F 17/30 | (2006.01) | |
| G06F 9/44 | (2006.01) | |
| G06F 9/45 | (2006.01) | |

(52) U.S. Cl.
CPC ............ *G06F 17/30292* (2013.01); *G06F 7/00* (2013.01); *G06F 8/314* (2013.01); *G06F 8/456* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 5,237,691 A | * | 8/1993 | Robinson ................. | G06F 8/30 717/107 |
| 5,721,912 A | * | 2/1998 | Stepczyk .......... | G06F 17/30569 |
| 5,774,661 A | * | 6/1998 | Chatterjee ............. | G06F 9/5038 709/203 |
| 6,718,368 B1 | * | 4/2004 | Ayyadurai ............ | H04L 12/585 704/1 |
| 7,917,463 B2 | | 3/2011 | Dagum et al. | |
| 2004/0044729 A1 | * | 3/2004 | Foerg ..................... | G06Q 30/06 709/203 |
| 2004/0049478 A1 | * | 3/2004 | Jasper et al. ...................... | 707/1 |
| 2004/0111479 A1 | * | 6/2004 | Borden ................ | G06Q 10/107 709/206 |
| 2005/0027583 A1 | * | 2/2005 | Smit ..................... | G06Q 40/00 705/35 |
| 2005/0160398 A1 | * | 7/2005 | Bjornson et al. .............. | 717/104 |
| 2006/0129440 A1 | * | 6/2006 | Frauenhoffer ... | G06Q 10/06315 705/7.25 |
| 2008/0086442 A1 | | 4/2008 | Dasdan et al. | |
| 2008/0095333 A1 | * | 4/2008 | Tudor ........................ | 379/88.17 |
| 2010/0205075 A1 | | 8/2010 | Zhang | |

(Continued)

FOREIGN PATENT DOCUMENTS

JP           2003330862 A    * 11/2003

OTHER PUBLICATIONS

Lin et al., "Data-Intensive Text Processing with MapReduce", Pre-Production Manuscript, 2010, 175 pages.*

(Continued)

*Primary Examiner* — Tony Mahmoudi
*Assistant Examiner* — Michael Le
(74) *Attorney, Agent, or Firm* — Cantor Colburn LLP

(57) ABSTRACT

A system for receiving a declarative specification including a plurality of stages. Each stage specifies an atomic operation, a data input to the atomic operation, and a data output from the atomic operation. The data input is characterized by a data type. Links between at least two of the stages are generated to create a data integration workflow. The data integration workflow is compiled to generate computer code for execution on a parallel processing platform. The computer code configured to perform at least one of data preparation and data analysis.

10 Claims, 8 Drawing Sheets

(56) References Cited

U.S. PATENT DOCUMENTS

| | | | |
|---|---|---|---|
| 2010/0241893 A1* | 9/2010 | Friedman et al. .................. | 714/2 |
| 2010/0257198 A1 | 10/2010 | Cohen et al. | |
| 2011/0029377 A1 | 2/2011 | Chen et al. | |
| 2011/0029477 A1 | 2/2011 | Tengli et al. | |
| 2011/0047172 A1 | 2/2011 | Chen et al. | |
| 2011/0191693 A1* | 8/2011 | Baggett ................ | G06Q 10/107 715/752 |
| 2011/0202484 A1* | 8/2011 | Anerousis .............. | G06N 7/005 706/12 |
| 2011/0307899 A1* | 12/2011 | Lee ........................ | G06F 9/5027 718/104 |
| 2012/0226639 A1* | 9/2012 | Burdick ................ | G06F 9/4843 706/12 |
| 2012/0330958 A1* | 12/2012 | Xu .......................... | G06F 17/16 707/738 |

OTHER PUBLICATIONS

Lin, Jimmy, "Exploring Large-Data Issues in the Curriculum: A Case Study with MapReduce", Proceedings of the Third WOrkshop on Issues in Teaching Computational Linguistics, pp. 54-61.*

A. Pavlo et al.; "A Comparison of Approaches to Large-Scale Analysis"; Jun. 29-Jul. 2, 2009; Providence, Rhode Island; pp. 1-14; ACM 978-1-60558-551—Feb. 9, 2006.

Doug Cutting; "Scalable Computing with Hadoop"; May 4, 2006; pp. 1-21—Retrieved on Jul. 28, 2011—http://61.153.44.88/apache/hadoop/yahoo-sds.pdf.

Cloud Computing: Benefits and Risks of Moving Federal IT into the Cloud, Testimony of Cita M. Furlani, Director, Information Technology Laboratory, National Institute of Standards and Technology, United States Department of Commerce, United States House of Representatives Committee on Oversight and Government Reform, Jul. 1, 2010, 11 pages.

S. Papadimitriou et al.; DISCO: Distributed Co-Clustering With Map-Reduce—2008—Eighth IEEE International Conference on Data Mining—pp. 512-521.

The NIST Definition of Cloud Computing (Draft)—Recommendations of the National Institute of Standards and Technology Peter Mell and Timothy Grance; pp. 1-7; Jan. 2011.

U.S. Appl. No. 13/872,467; Non-Final Office Action; Date Filed: Apr. 29, 2013; Date Mailed Oct. 9, 2013; 15 pages.

* cited by examiner

DECLARATIVE SPECIFICATION OF DATA INTEGRATION WORKFLOWS FOR EXECUTION ON PARALLEL PROCESSING PLATFORMS

BACKGROUND

The present invention relates to computer systems, and more specifically to declarative specification of data integration workflows for execution on parallel processing platforms.

MapReduce is an example of a software framework that is utilized to define and execute data integration workflows on parallel processing platforms. MapReduce is utilized for processing large datasets to solve certain kinds of distributable problems using a large number of computers, collectively referred to as a cluster if all nodes use the same hardware or as a grid if the nodes use different hardware. Computational processing occurs on data stored either in a filesystem (unstructured) or within a database (structured). A map step in a MapReduce framework includes a master node receiving input, partitioning the input up into smaller sub-problems, and distributing the smaller sub-problems to slave nodes. A reduce step in a MapReduce framework occurs when the answers of a group of sub-problems are combined in some way to get the output (i.e., the answer to the problem that it was originally trying to solve).

An example of a MapReduce framework is Hadoop, which includes a programming model and an associated implementation for processing large data sets. Users specify a map function that processes a key/value pair to generate a set of intermediate key/value pairs, and a reduce function that merges the set of intermediate values associated with the same intermediate key. An advantage of using a MapReduce framework is that it allows for distributed processing of the map and reduce operations. Mapping operations are independent of each other, and thus, at times all of the map functions are performed in parallel, although in practice this is often limited by the data source and/or the number of central processing units (CPUs). MapReduce is used by very large server farms to sort through petabytes of data in a relatively short period of time. The parallelism supported by MapReduce also allows for recovering from the partial failure of servers or storage during the operation. For example, if one mapper or reducer fails, the work is rescheduled (assuming that the input data is still available).

SUMMARY

According to exemplary embodiments, a, computer program product and system for receiving a declarative specification that includes a plurality of stages. Each stage specifies an atomic operation, a data input to the atomic operation, and a data output from the atomic operation. The data inputs are characterized by a data type. Links between at least two of the stages are generated to create a data integration workflow. The data integration workflow is compiled to generate computer code for execution on a parallel processing platform. The computer code is configured to perform at least one of data preparation and data analysis.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
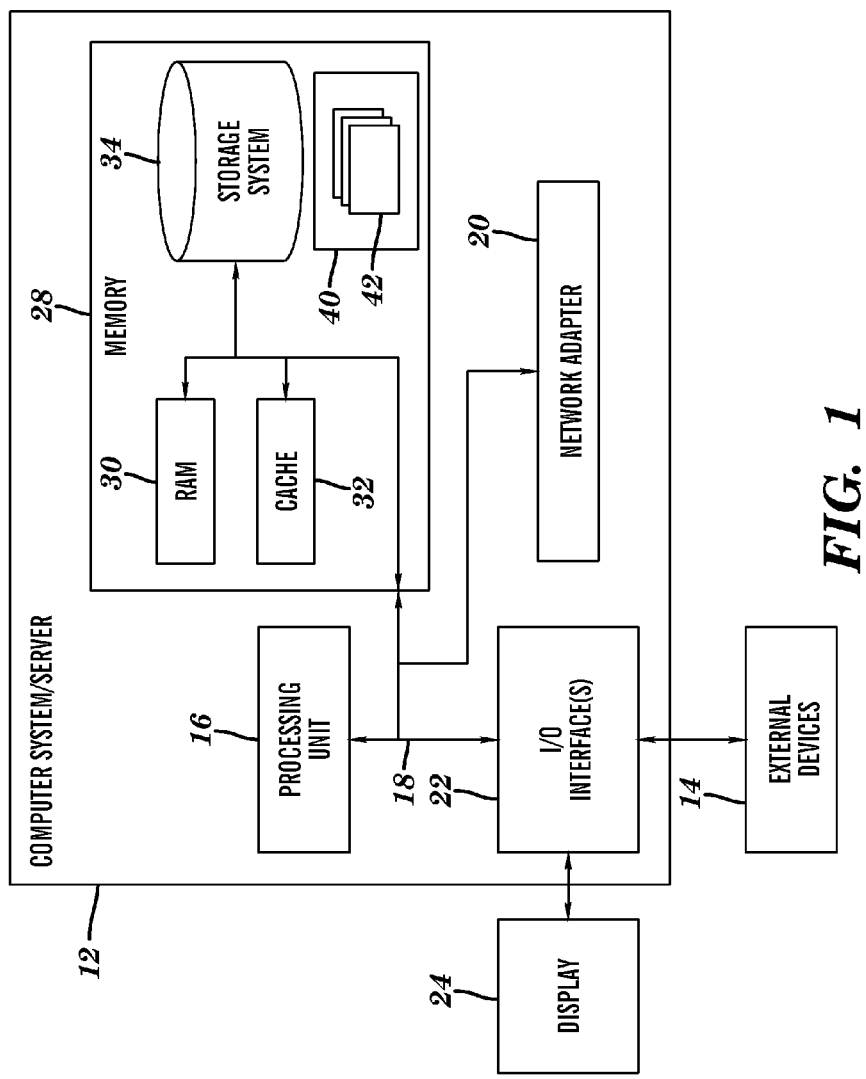
FIG. 1 illustrates a cloud computing node according to an embodiment of the present invention.

An embodiment is a simplified and easy to use method of building data integration workflows for use in performing data analytics on large volumes of data. A data integration workflow, which is compiled and executed on a parallel processing platform, is built using atomic stages and links between the atomic stages. The data integration workflow as described herein is defined by a user in a visual declarative manner via a graphical user interface screen. The resulting data integration workflow is automatically compiled into computer code for execution on a parallel processing platform to prepare the data for analysis and/or to perform data analysis. As used herein, the term "parallel processing platform" refers to a processor(s) where a plurality of calculations are carried out simultaneously.

MapReduce is used herein as an example of a software framework that may is used to define and execute data integration workflows on a parallel processing platform. It should be understood that embodiments are not limited to the MapReduce framework and that any software framework that provides data integration workflows for execution on parallel processing platforms may be utilized.

Contemporary map and reduce programs in a MapReduce framework are written in programming languages such as, but not limited to Java and Python, or in scripting languages such as, but not limited to Pig, Hive and Jaql. Thus, computer programming skill is required to write contemporary map and reduce programs for execution on a MapReduce platform. In contrast, exemplary embodiments described herein, provide map and reduce programs for execution on a MapReduce platform that are written as declarative specifications (e.g., using a graphical user interface) that allow a user without computer programming skills to generate MapReduce applications that comply with the MapReduce framework.

Data analytics for extracting business insights, by integrating different kinds of massive amounts of data, is becoming widespread, however building analytics applications is notoriously difficult due to required expertise in statistics, machine learning, data management, graph theory, algorithms, systems and parallel processing. Typical business analysts and system analysts do not have these skills and this gap often results in inconsistencies in the analysis and implementation, induces delays, and sometimes even results in important business insights being missed. These skill gap issues are minimized by providing a tool for building data integration workflows that allows for ease of analytics extraction so that typical business users can represent the required operations in a simple, easy to use, visual manner.

As the complexity of the data integration workflows increases, the development, debugging, and maintenance of data integration workflows becomes a bigger challenge. The ability to write data integration workflows as a sequence of atomic stages, as provided by embodiments described herein, reduces the complexity of the development, debugging, and maintenance of data integration workflows.

A data integration workflow process may be performed in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
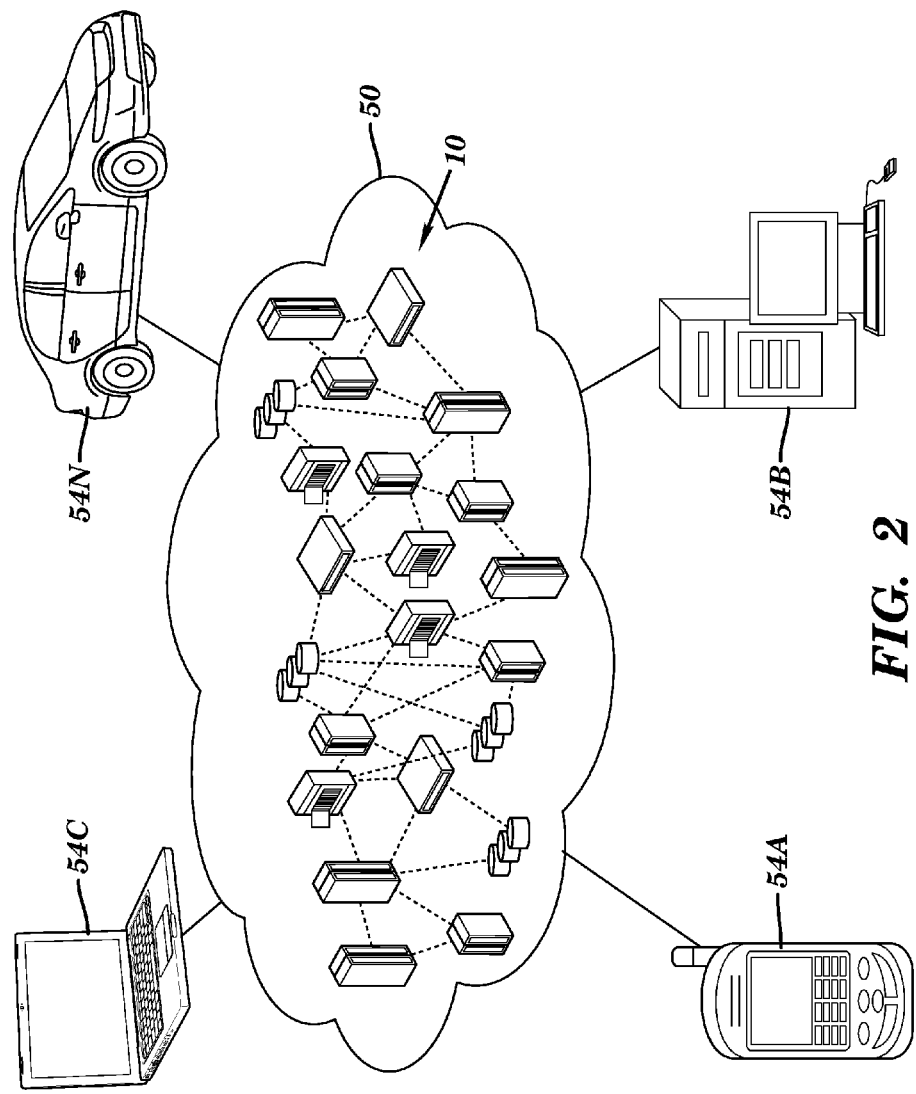
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
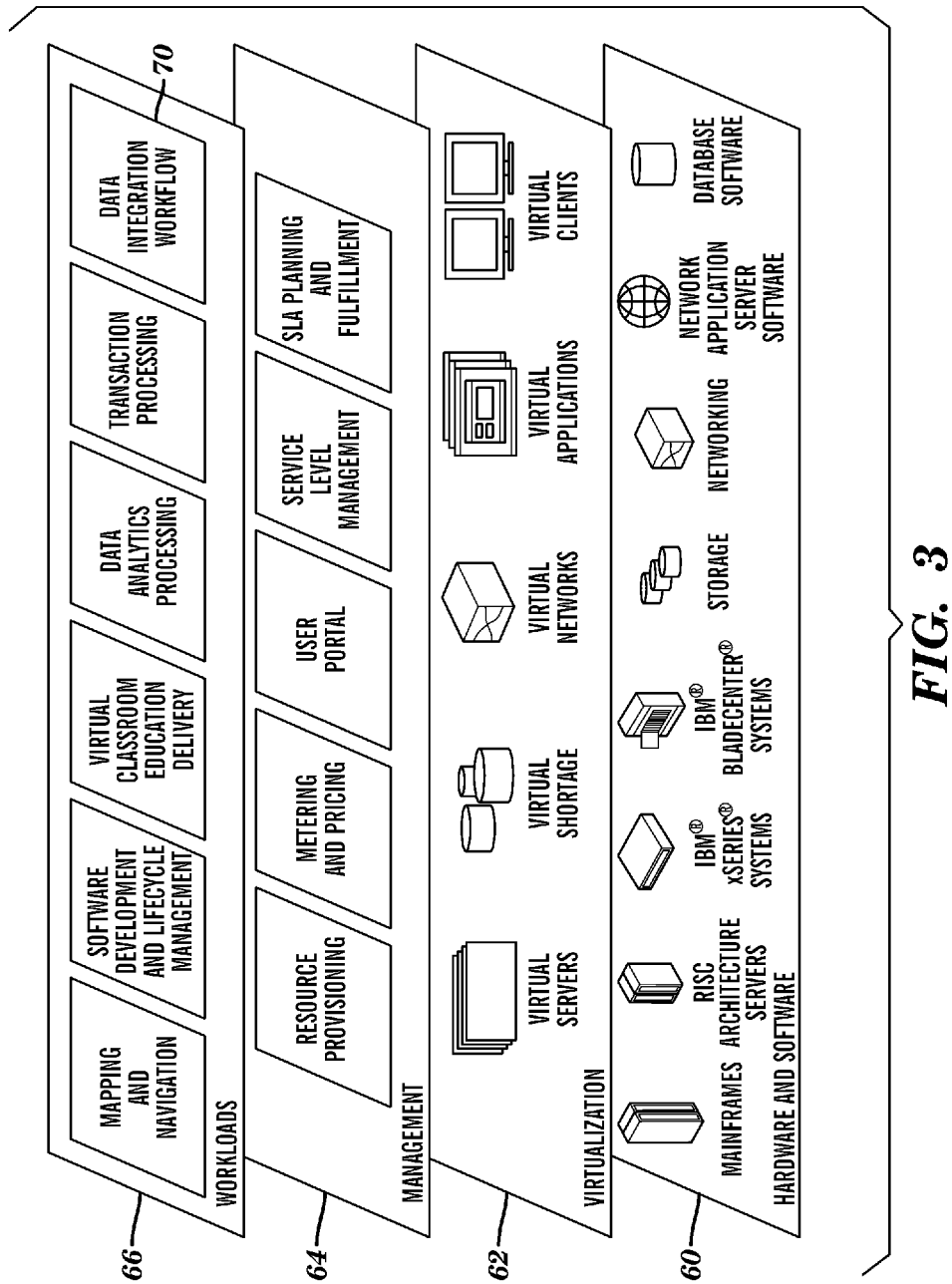
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data integration workflow processing.

In one exemplary embodiment, a data integration workflow application 70 in the workloads layer 66 implements the column based data integration workflow processes described herein; however, it will be understood that the data integration workflow application 70 may be implemented in any layer.

The data integration workflow application 70 includes a user interface that enables a user or authorized individual to create data integration workflows, compile the data integration workflows into MapReduce routines, to select sources of data to be utilized when the data integration workflows are executed, and to initiate execution of the MapReduce routines.

Figure 4:
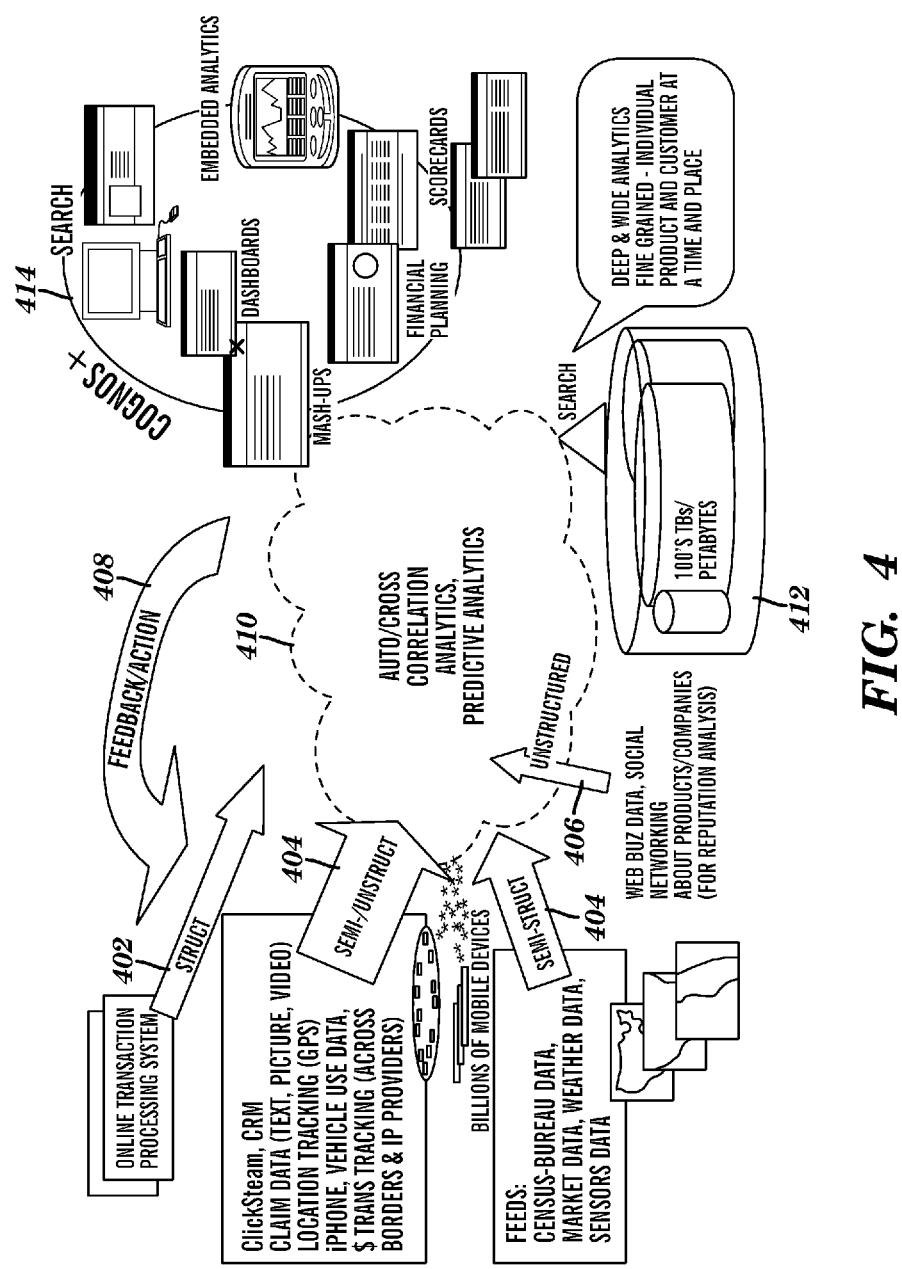
FIG. 4 illustrates different types of data sources and types of data that may be integrated in accordance with an embodiment of the present invention.

Referring to FIG. 4, an illustration of different data sources and different types of data that may be integrated using a MapReduce framework is generally shown. Structured data 402, semi-structured data 404 and unstructured data 406 are extracted from a variety of sources and a variety of locations, and then merged together using analytics such as auto/cross correlation analytics and predictive analytics. One option for performing the data collection is to use an extract, transform and load (ETL) tool located, for example, in cloud computing environment 410. The merged data is stored in a storage device 412 in a format that is easily accessible by end users, such as business analysts, via a user device 414. Feedback/action 408 is then initiated based on the results of the analysis. As shown in FIG. 4, the structured data 402 is characterized by data values being located in set locations and includes data from any online transaction processing system that is formatted for example, as relational data. The semi-structured data 404 has a somewhat predictable pattern and includes data such as click stream data, location tracking data, vehicle use data, census bureau data, etc. The unstructured data 406 does not have particular types of data in any set locations or patterns and includes data such as text data from social networking websites.

One example of massive scale data analytics that uses structured data as input is fraud detection analysis. In fraud detection analysis the number of times that a credit card is used at two specified types of stores is counted, and a range of amounts at each store within a certain time interval are output. Another example of massive scale data analytics is when semi-structured data is input to web analytics. An example of web analytics is the extracting of performance indicators, such as the percentage of customers shopping in an on-line store that selected items for their shopping cart and then left the on-line store without purchasing the items in their shopping cart (i.e., they left the on-line store without checking out while the shopping cart was non-empty). Other examples of massive scale data analytics include system log mining to integrate logs of different types (e.g., WebSphere, DB2, etc.) into a common framework in order to answer queries on the logs. An example query is "what happened to WebSphere after DB2 got started?". In addition, text flows may be developed using atomic operations that involve various information extracting techniques such as entity identification, relationship extraction, classification, sentiment analysis, etc. As used herein, the term "atomic operation" refers to an operation that includes a single operation or several sub-operations that must be performed as a unit.

Figure 5:
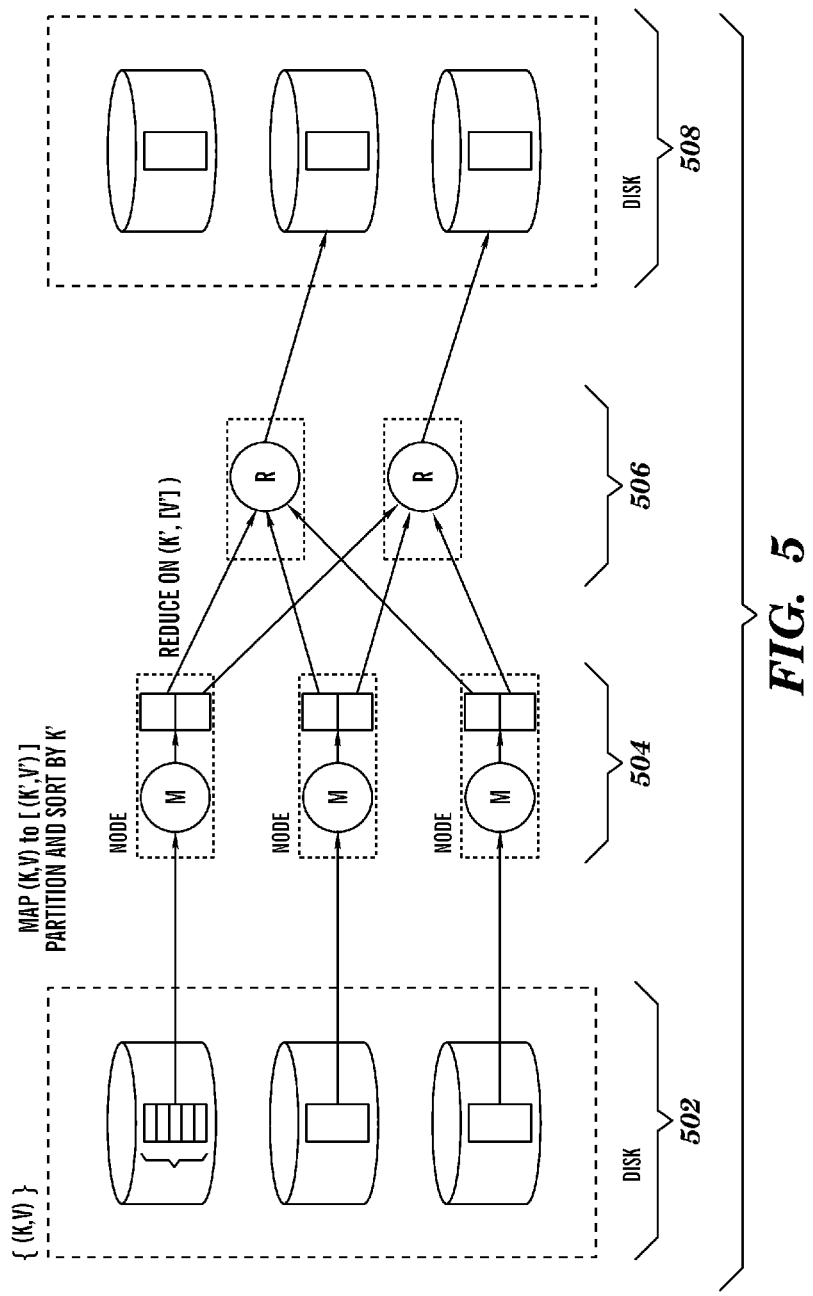
FIG. 5 illustrates a flow diagram of a process performed by a MapReduce framework in accordance with an embodiment of the present invention.

Referring to FIG. 5, a flow diagram of a process performed by a MapReduce framework is generally shown. The MapReduce framework provides a simple model to write distributed programs to be executed over a large number of processors. These distributed programs are referred to herein as MapReduce applications. The processing shown in FIG. 5 is implemented, for example, by the data integration workflow application 70. As shown in FIG. 5, the data to be analyzed is spread over several disks in a first data domain 502.

The map and reduce functions of MapReduce are both defined with respect to data structured in the form of (key, value) pairs. The map function takes one pair of data with a type in the first data domain 502 and returns an array of (key, value) pairs in a second data domain 504. This is shown in FIG. 5 as Map (K, V) to [(K', V')]. The map function is applied in parallel to every item in the input dataset. This produces a list of (K', V') pairs for each call. Next, the MapReduce framework collects all pairs with the same key from all lists and groups them together, thus creating one group for each one of the different generated keys.

As shown in FIG. 5, the reduce function is then applied in parallel to each group in the second data domain 504, which in turn produces a third data domain 506. Contents of the third data domain 506 are shown in FIG. 5 as Reduce on (K', [V']). The returned results of all reduce instances are collected as the desired result and stored as a fourth data domain 508. Thus, the MapReduce framework as shown in FIG. 5 transforms a list of (key, value) pairs into a list of values. The MapReduce framework is different than a typical functional programming map and reduce combination that accepts a list of arbitrary values and returns one single value that combines all of the values returned by map.

Figure 6:
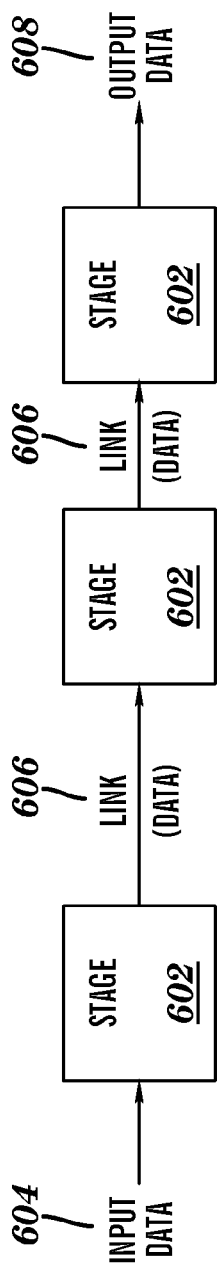
FIG. 6 illustrates a data integration workflow having a plurality of stages and links in accordance with an embodiment of the present invention.

Referring to FIG. 6, a data integration workflow having a plurality of stages 602 and links 606 in accordance with an embodiment of the present invention is generally shown. A user interface screen, such as display 24, displays a sequence of stages 602 and links 606 as shown in FIG. 6 and allows the user to edit the data integration workflow (e.g., delete, insert, copy stages 602 and links 606, edit content of stages 602 and links 606) via a graphical user interface. The user interface screen is a touch screen or alternatively, user selection is made using a selection device such as a mouse.

Input data is received into a first sequential stage 602 and output data 608 is output from the last stage 602 in the sequence. In addition, the data output of a stage 602 becomes the data input of the next stage 602 in the sequence. The data integration workflow shown in FIG. 6 is visually designed using atomic stages 602 and links 606. Each stage 602 performs an atomic operation on input data to produce output data. In most cases, the data input to each stage 602 is of a particular type (structured, semi-structured, or unstructured), however embodiments described herein support inputs of multiple types into a stage 602. In addition, different stages 602 are capable of processing different types of data in the data integration workflow. The stages 602 are attached together using links 606. Each link 606 has a schema definition flowing through it. The schema definition is characterized as either strict (for structured data) or loose (e.g., only specifies a data type such as "string" for unstructured text). The output schema of a stage 602 is an input schema for the next stage 602. In an embodiment, when the schema is a loose schema, only the properties or part of schema that are required at the output are defined and the other properties are hidden.

Stages 602 that receive structured data as input perform operations such as, but not limited to: select, join, and aggregate, Stages 602 that receive semi-structured hierarchical data as input perform operations such as, but not limited to: restructuring (promoting child as sibling, demoting sibling as child), expanding (creating an array of values of a particular attribute and putting it as child in the tree), as well as the operations performed when the input data is structured. Stages 602 that receive unstructured text data as input perform operations such as, but not limited to: classifying text (output schema may have the input text along with its class), extracting particular kinds of entities from text (output schema may have an array of person names and phone numbers), and sentiment detection (image categorization, video filtering, etc.).

Figure 7:
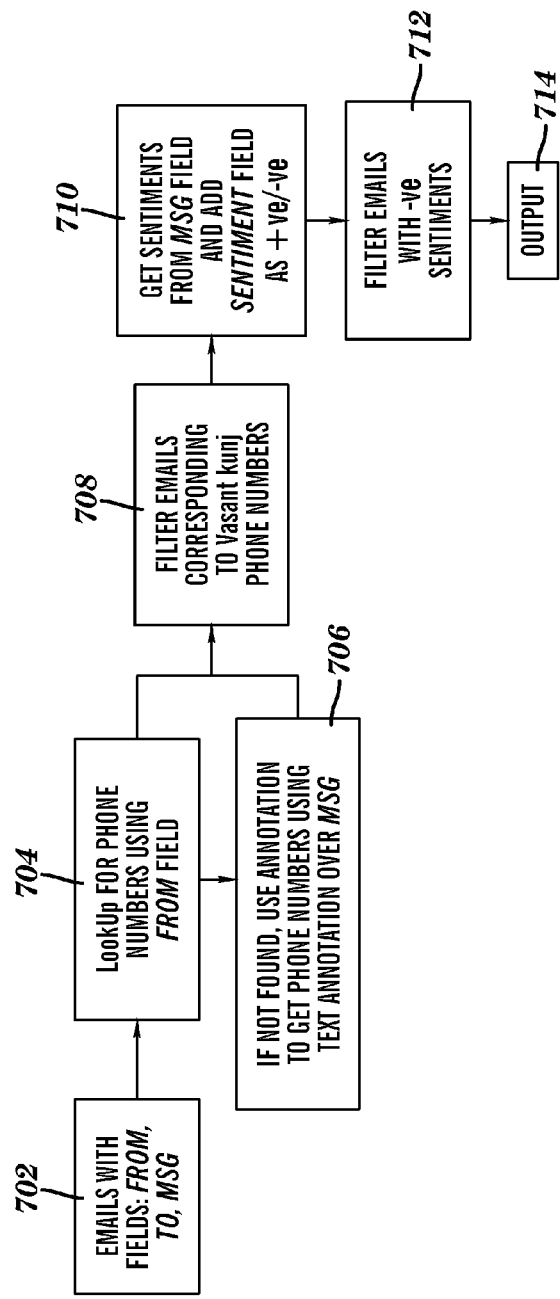
FIG. 7 illustrates an example data integration workflow for implementing a filter process in accordance with an embodiment of the present invention.

An example data integration workflow for implementing a filter process in accordance with an embodiment of the present invention is generally shown in FIG. 7. The input to the first stage 704 is structured data that includes the "from", "to", and "message" fields from emails. A phone number corresponding to a name in the "from" field is looked up in a look-up table at stage 704. If the phone number is not found in the look-up table, stage 706 is performed to attempt to retrieve the phone number in another way using unstructured data. A rule based annotator may be used to extract the phone numbers from natural language data. An example of a rule used by the rule based annotator is: three digits followed by a dash that is followed by seven digits indicates a phone number. The output from stages 704 and 706 are a sequence/array of phone numbers. These phone numbers are input to stage 708, where phone numbers of customers from a particular area (say, "Vasant kunj"), are filtered. The emails corresponding to "Vasant kunj" phone numbers are sent to stage 710 where sentiments are extracted from the message field (unstructured data) and a sentiment field is updated with a positive or a negative. Emails with a sentiment field containing a negative are filtered at stage 712 and then output 714. This example is intended to show one example of a data integration workflow that may be generated by an exemplary embodiment, and as such it is not intended to be limiting.

A data integration workflow, such as the one shown in FIG. 7, is built using a series of operators connected using input-output (I/O) relationships. The workflow may be built visually (e.g., by a user at a user input screen) using stages, representing operators, and links to represent the I/O relationships. For building the workflow visually, a tool is used to provide a pallet of stages and links. A user selects stages from the pallet and puts them into a canvass (e.g., an input screen such as display 24 that displays where a user can pick and drop and draw). These stages are then joined using links from the pallet, and properties of the stages and links are specified by the user.

Figure 8:
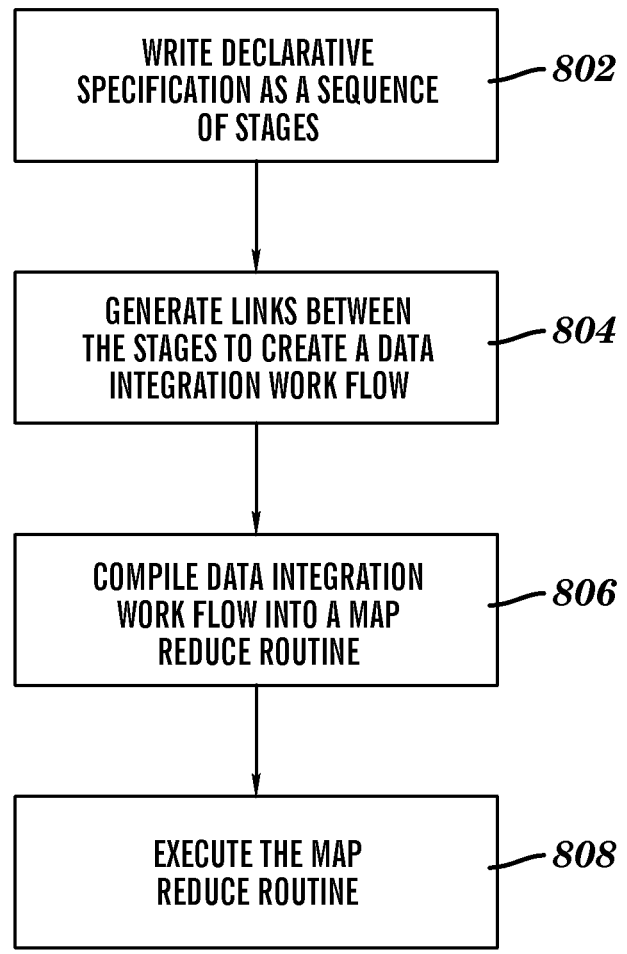
FIG. 8 illustrates a flow diagram of a process for creating and executing a data integration workflow in accordance with an embodiment of the present invention.

Turning now to FIG. 8, a flow diagram of a process for creating and executing a data integration workflow in accordance with an embodiment of the present invention is generally shown. A declarative specification that includes a sequence of stages is written by a user (e.g., a business analyst) at block 802. Each stage specifies an atomic operation, a data input, and a data output. Links are added between the stages to create a data integration workflow at block 804. Processing continues at block 806 where the data integration workflow (including the links and the stages) is compiled into a MapReduce routine. Compilation involves converting a visual job over mixed data into one or more MapReduce programs. The compilation is performed by converting each stage into a corresponding MapReduce application and using the links to define the I/O relationships between the stages. Alternatively, compilation is performed by converting the visual flow into a script in a scripting language (e.g., Jaql), which in turn is compiled into one or more MapReduce programs. Processing completes at block 808 when the MapReduce routine is executed.

A declarative specification of a data processing job on a parallel processing platform is used to generate the data integration workflows. As used herein, the term "declarative specification" refers to the user specifying (declaring) the operations that need to be performed by the MapReduce programs rather than describing how the operations need to be performed using the MapReduce programs. The declarative specification may use operators in a visual manner. In addition, the job supports processing being performed on multiple types of data (mixed data processing), including, but not limited to: structured, semi-structured, and unstructured data. Further, the job may be specified as a cascade of atomic operators, including, text processing operators. The atomic operator also optionally includes machine learning operators. In an embodiment, the parallel processing platform is Hadoop.

The translating of the declarative specification into a lower level language includes executing operators as lower level language primitives and library functions. Examples of a lower level language include JAQL query language and Java MapReduce programs. The translation of declarative also includes compilation of the job. The compilation may be performed by traversing the job, where the job is made up of nodes (or stages) and edges. Stages are defined such that each stage results in one atomic operation. Atomicity of the operation depends on the specificity of the types of jobs being designed.

Data integration involving different types of data in a single workflow includes writing a data integration workflow (also referred to herein as a "job") as a sequence of stages each representing atomic operation on one or more types of data. In addition, loose hierarchical schemas are written for various stages of the data integration workflow. The job is compiled into a MapReduce routine either directly or indirectly through some other language/data model. The generated MapReduce routines are then executed over Hadoop or any other distributed processing system.

Methods for representing unstructured text processing as a series of atomic operations include writing an unstructured data integration workflow as a series of atomic operations such as entity identification, classification, sentiment detection, etc. Each atomic operation is represented as a stage and stages are connected using links based on their input-output relationships. The data integration workflow is configured into a MapReduce routine either directly or indirectly through some other language/data model. The generated MapReduce routines are then executed over Hadoop or any other distributed processing system.

The map reduce routines are optimized to generate map reduce routines with an optimum number of mappers and reducers. Any MapReduce program can be run as a number of map and reduce instances based on, for example, the data size and the computing capabilities. By optimally setting the number of map and reduce instances the resource consumption and time taken to execute a job is reduced.

Technical effects and benefits include the ability to write data integration workflows as a sequence of atomic stages, which leads to a reduction in the complexity of data integration workflows.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system, comprising:
   a computer processor; and
   logic executable by the computer processor, the logic configured to:
   receive a declarative specification that includes a plurality of stages, each stage specifying an atomic operation, a data input to the atomic operation, and a data output from the atomic operation, the data input characterized by a data type, the data type being at least one of structured data, semi-structured data, and unstructured data;
   reduce a complexity of the declarative specification by generating links between at least two of the plurality of stages to create a data integration workflow, the at least two of the plurality of stages in the data integration workflow having data inputs characterized by different data types;
   compile the data integration workflow to generate computer code for execution on a parallel processing platform, the computer code including instructions configured for:
   accessing subsets of interrelated data corresponding to the data inputs,
   applying a mapping operation in parallel to the subsets of the interrelated data to generate a plurality of output groups, and
   merging the plurality of output groups according to the data integration workflow to generate at least one output of the data outputs, the at least one output being characterized by a singular data type;
   optimize with an optimum number of mappers and reducers the computer code for execution on the parallel processing platform;
   perform a filter operation via the computer code to retrieve a phone number, the filter operation includes:
   accessing structured data subset corresponding to a first data input, the structured data subset including a name,
   retrieving the phone number from a look-up table with respect to the name,
   retrieving the phone number from unstructured data subset corresponding the first data input by utilizing a rule based annotator to extract numbers from natural language of the unstructured data subset when the phone number is not initially retrieved from the look-up table,
   filtering at least one email corresponding to the phone number,
   extracting positive or negative sentiments from unstructured data of a message field of the at least one email corresponding to the phone number, and
   outputting the at least one email as the at least one output when a negative sentiment is extracted from the unstructured data of the message field; and
   update a sentiment field in accordance with the positive or negative sentiments extracted from the unstructured data of the message field,
   wherein the computer code is a MapReduce application.

2. The system of claim 1, wherein the method further comprises executing the computer code on the parallel processing platform.

3. The system of claim 1, wherein the declarative specification is received from a user via a user interface screen.

4. The system of claim 1, wherein each of the subsets of interrelated data is stored across a plurality of physical storage locations, each physical storage location including a subset of the interrelated data.

5. The system of claim 1, wherein the at least one output of the data outputs is a merger of the data inputs characterized by different data types of either of the at least two of the plurality of stage.

6. A computer program product comprising a non-transitory storage medium having program instructions embodied therewith, the program instructions executable by a processing circuit to cause the processing circuit to perform:
   receiving a declarative specification that includes a plurality of stages, each stage specifying an atomic operation, a data input to the atomic operation, and a data output from the atomic operation, the data input characterized by a data type, the data type being at least one of structured data, semi-structured data, and unstructured data;
   reduce a complexity of the declarative specification by generating links between at least two of the plurality of stages to create a data integration workflow, the at least two of the plurality of stages in the data integration workflow having data inputs characterized by different data types;
   compiling the data integration workflow to generate computer code for execution on a parallel processing platform, the computer code including instructions configured:
   accessing subsets of interrelated data corresponding to the data inputs,
   applying a mapping operation in parallel to the subsets of the interrelated data to generate a plurality of output groups, and merging the plurality of output groups according to the data integration workflow to generate at least one output of the data outputs;

optimize with an optimum number of mappers and reducers the computer code for execution on the parallel processing platform;

perform a filter operation via the computer code to retrieve a phone number, the filter operation includes:

accessing structured data subset corresponding to a first data input, the structured data subset including a name, retrieving the phone number from a look-up table with respect to the name, retrieving the phone number from unstructured data subset corresponding the first data input by utilizing a rule based annotator to extract numbers from natural language of the unstructured data subset when the phone number is not initially retrieved from the look-up table, filtering at least one email corresponding to the phone number, extracting positive or negative sentiments from unstructured data of a message field of the at least one email corresponding to the phone number, and outputting the at least one email as the at least one output when a negative sentiment is extracted from the unstructured data of the message field; and update a sentiment field in accordance with the positive or negative sentiments extracted from the unstructured data of the message field, wherein the computer code is a MapReduce application.

7. The computer program product of claim 6, wherein the method further comprises executing the computer code on the parallel processing platform.

8. The computer program product of claim 6, wherein the declarative specification is received from a user via a user interface screen.

9. The computer program product of claim 6, wherein each of the subsets of interrelated data is stored across a plurality of physical storage locations, each physical storage location including a subset of the interrelated data.

10. The computer program product of claim 6, wherein the at least one output of the data outputs is a merger of the data inputs characterized by different data types of either of the at least two of the plurality of stage.

* * * * *